United States Patent

[11] 3,598,473

[72] Inventor Arthur H. Shoemaker
East Aurora, N.Y.
[21] Appl. No. 20,732
[22] Filed Mar. 18, 1970
[45] Patented Aug. 10, 1971
[73] Assignee American Optical Corporation
Southbridge, Mass.

[54] THREE-MEMBER ACHROMATIC MICROSCOPE OBJECTIVE
2 Claims, 1 Drawing Fig.

[52] U.S. Cl............................................ 350/176,
350/175 ML, 350/216, 350/225
[51] Int. Cl......................................... G02b 9/12,
G02b 21/02

[50] Field of Search........................................ 350/175
ML, 176, 216, 225

[56] References Cited
UNITED STATES PATENTS
3,355,234 11/1967 Muller.......................... 350/176
3,437,398 4/1969 Muller et al. ................. 350/225 X

*Primary Examiner*—John K. Corbin
*Attorneys*—William C. Nealon, Noble S. Williams and Robert J. Bird ABSTRACT: A three-member microscope objective having a numerical aperture of substantially 0.07 and a magnification of substantially 2.5 ×.

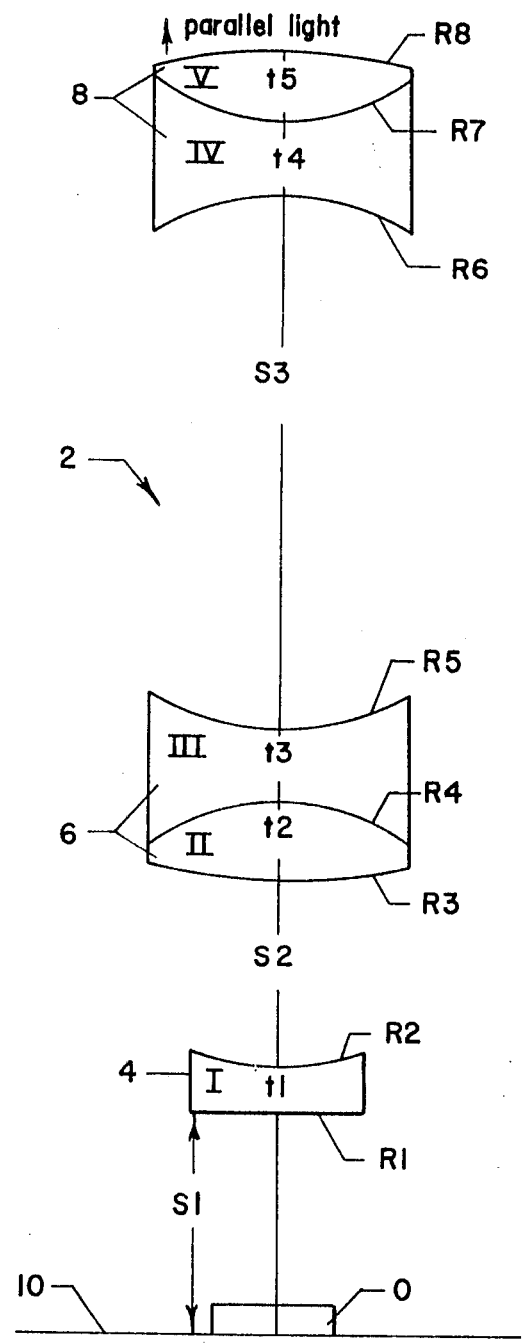

THREE-MEMBER ACHROMATIC MICROSCOPE OBJECTIVE

BACKGROUND OF THE INVENTION

The present invention relates to a microscope objective.

An object of the present invention is to provide an achromatic microscope objective having a numerical aperture of substantially 0.07 and a magnification of substantially 2.5X, in which chromatic and spherical aberrations, coma, and astigmatism are well corrected while providing a substantially flat image field when used with a telescope objective as described in U.S. Pat. No. 3,355,234 and a typical 10X eyepiece.

DRAWING

In the drawing, a microscope objective is represented by a plurality of lenses viewed transversely to their axis.

DESCRIPTION

Referring now to the drawing, a microscope objective is generally shown at 2. It includes a front single lens 4, a doublet 6, and a doublet 8, all of said lenses being in axial alignment. Objective 2 is disposed relative to an object plane 10 (and an object 0) as shown in the drawing.

Lens 4, also designated I, is a negative planoconcavo-shaped lens. Doublet 6 includes a double convex lens II and a double concave lens III, together forming a negative convex-concavo doublet. Doublet 8 includes a double concave lens IV and a double convex lens V, together forming a positive con-cavoconvex doublet.

The lens parameters are as follows: The successive lens radii are designated R1—R8, where a minus sign indicates radii on centers of curvature lying on the object side of their vertices. The axial thicknesses of successive lens elements are designated T1—T5. The successive axial spaces from the object plane 10 are designated S1—S3. The refractive indices of the successive lens elements are designated ND1—ND5. The Abbe numbers of the successive lens glasses are designated $\nu 1 - \nu 5$ respectively.

The above-mentioned parameters are related to the focal length according to the following constructional data:

[Magnification = 2.5X    N.A. = .07]

| Lens | Radius (R) | Thickness (T) | Space (S) | Refractive index (ND) | Abbé Number ($\nu$) |
|---|---|---|---|---|---|
| | | | S1=.13071F | | |
| I | R1=Plano | T1=.02052F | | ND1=1.78833 | $\nu$1=50.47 |
| | R2=.08962F | | S2=.10071F | | |
| II | R3=.19820F | T2=.03464F | | ND2=1.80491 | $\nu$2=25.42 |
| III | R4=−.07277F | T3=.01487F | | ND3=1.74931 | $\nu$3=34.93 |
| | R5=.12784F | | S3=.17226F | | |
| IV | R6=−.90848F | T4=.02051F | | ND4=1.80491 | $\nu$4=25.42 |
| V | R7=.23001F | T5=.04835F | | ND5=1.78833 | $\nu$5=50.47 |
| | R8=−.22042F | | | | |

The foregoing parameters of radius, thickness and space are based on the value of F. The value of F in this case, as an example is 73.109 millimeters. Given in numbers, the foregoing data is as follows:

[F=73.109    Magnification=2.5X    N.A.=0.07]

| Lens | Radius (R) | Thickness (T) | Space (S) | Refractive index (ND) | Abbé Number ($\nu$) |
|---|---|---|---|---|---|
| | | | S1=9.556 | | |
| I | R1=Plano | T1=1.500 | | ND1=1.78833 | $\nu$1=50.47 |
| | R2=6.552 | | S2=7.363 | | |
| II | R3=14.490 | T2=2.533 | | ND2=1.80491 | $\nu$2=25.42 |
| III | R4=−5.32 | T3=1.087 | | ND3=1.74931 | $\nu$3=34.93 |
| | R5=9.346 | | S3=12.594 | | |
| IV | R6=−66.418 | T4=1.500 | | ND4=1.80491 | $\nu$4=25.42 |
| V | R7=16.815 | T5=3.535 | | ND5=1.78833 | $\nu$5=50.47 |
| | R8=−16.114 | | | | |

It will be apparent that the foregoing absolute values are variable depending on the value of F. Other forms are thus possible and changes may be made in the values of the constructional data based on the relationships in the first of the above charts, without departing from the spirit of this invention.

What I claim is:

1. An achromatic microscope objective having a magnification of substantially 2.5X and a numerical aperture of substantially 0.07 for forming an image of an object plane, said image being well corrected for spherical and chromatic aberrations, coma, astigmatism and curvature of image field, said objective comprising, in axial alignment:
   a front planoconcavo singlet lens member I;
   a second double-convex lens member II;
   a third double-concave lens member III;
   said second and third members forming a negative doublet;
   a fourth double-concave lens member IV;
   a fifth double-convex lens member V;
   said fourth and fifth members forming a positive doublet;
   the parameters of lens radii (R1—R8), lens thicknesses (T1—T5), axial spaces among lens elements and object plane (S1—S3), refractive indices (ND1—ND5), and Abbe numbers ($\nu 1 - \nu 5$), being determined by the following relationship:

[F=73.109    Magnification=2.5X    N.A.=0.07]

| Lens | Radius (R) | Thickness (T) | Space (S) | Refractive index (ND) | Abbé Number ($\nu$) |
|------|-----------|---------------|-----------|----------------------|---------------------|
| I    | R1=Plano  | T1=.02052F    | S1=.13071F |                      |                     |
|      | R2=.06962F|               |           | ND1=1.78833          | $\nu$1=50.47        |
| II   | R3=.19820F| T2=.03464F    | S2=.10071F | ND2=1.80491          | $\nu$2=25.42        |
| III  | R4=−.07277F| T3=.01487F   |           | ND3=1.74931          | $\nu$3=34.93        |
|      | R5=.12784F|               | S3=.17226F |                      |                     |
| IV   | R6=−.90848F| T4=.02051F   |           | ND4=1.80491          | $\nu$4=25.42        |
|      | R7=.23001F|               |           |                      |                     |
| V    | R8=−.22042F| T5=.04835F   |           | ND5=1.78833          | $\nu$5=50.47        | wherein scalar values are given in millimeters.

2. An achromatic microscope objective having a magnification of substantially 2.5X and a numerical aperture of substantially 0.07 for forming an image of an object plane, said image being well corrected for spherical and chromatic aberrations, coma, astigmatism and curvature of image field, said objective comprising, in axial alignment:

a front planoconcavo singlet lens member I;
a second double-convex lens member II;
a third double-concave lens member III;
said second and third members forming a negative doublet;
a fourth double-concave lens member IV;
a fifth double-convex lens member V;
said fourth and fifth members forming a positive doublet;
the parameters of lens radii (R1—R8), lens thicknesses (T1—T5), axial spaces among lens elements and object plane (S1—S3), refractive indices (ND1—ND5), and Abbe numbers ($\nu$1—$\nu$5), being determined by the following relationship:

[F=73.109    Magnification=2.5X    N.A.=0.07]

| Lens | Radius (R) | Thickness (T) | Space (S) | Refractive index (ND) | Abbé Number ($\nu$) |
|------|-----------|---------------|-----------|----------------------|---------------------|
| I    | R1=Plano  | T1=1.500      | S1=9.556  |                      |                     |
|      | R2=6.552  |               |           | ND1=1.78833          | $\nu$1=5047         |
|      |           |               | S2=7.363  |                      |                     |
| II   | R3=14.490 | T2=2.533      |           | ND2=1.80491          | $\nu$2=25.42        |
| III  | R4=−5.32  | T3=1.087      |           | ND3=1.74931          | $\nu$3=34.93        |
|      | R5=9.346  |               | S3=12.594 |                      |                     |
|      | R6=−66.418|               |           |                      |                     |
| IV   | R7=16.815 | T4=1.500      |           | ND4=1.80491          | $\nu$4=25.42        |
| V    | R8=−16.114| T5=3.535      |           | ND5=1.78833          | $\nu$5=40.57        | wherein scalar values are given in millimeters.